(12) United States Patent  
Gibboney

(10) Patent No.: US 7,976,191 B2
(45) Date of Patent: Jul. 12, 2011

(54) LIGHT STRING OF LEDS

(75) Inventor: James W. Gibboney, Conyers, GA (US)

(73) Assignee: Best Point Group, Ltd., Taipei (TW)

( * ) Notice: Subject to any disclaimer, the term of this patent is extended or adjusted under 35 U.S.C. 154(b) by 328 days.

(21) Appl. No.: 11/863,365

(22) Filed: Sep. 28, 2007

(65) Prior Publication Data

US 2008/0157688 A1    Jul. 3, 2008

Related U.S. Application Data

(60) Provisional application No. 60/848,660, filed on Oct. 2, 2006.

(51) Int. Cl.
*F21S 4/00* (2006.01)

(52) U.S. Cl. ............... 362/249.05; 362/231; 362/249.14

(58) Field of Classification Search .................. 362/231, 362/249.02, 249.05, 249.12, 249.14, 800; 315/185 S, 200 A, 209 R, 312, 320, 321, 315/322, 323, 324, 325, 326

See application file for complete search history.

(56) References Cited

U.S. PATENT DOCUMENTS

| | | | |
|---|---|---|---|
| 5,495,147 A * | 2/1996 | Lanzisera | 315/312 |
| 5,777,868 A | 7/1998 | Gibboney, Jr. | |
| 6,367,952 B1 | 4/2002 | Gibboney, Jr. | |
| 6,869,313 B2 | 3/2005 | Gibboney, Jr. | |
| 7,045,965 B2 * | 5/2006 | Li et al. | 315/322 |
| 6,367,952 C1 | 2/2007 | Gibboney, Jr. | |
| 2003/0235049 A1 * | 12/2003 | Wu | 362/391 |
| 2005/0174065 A1 * | 8/2005 | Janning | 315/185 S |
| 2007/0247868 A1 * | 10/2007 | Li | 362/391 |

* cited by examiner

*Primary Examiner* — Y My Quach Lee
(74) *Attorney, Agent, or Firm* — C. G. Mersereau; Nikolai & Mersereau, P.A.

(57) ABSTRACT

An LED light string includes series-connected groups of individual LEDs or sets of LEDs, with each LED or set of LEDs in each group being electrically in parallel with each other LED or set of LEDs and with a parallel group device that regulates voltage within the group when LEDs in that group fail. The current to the LEDs is rectified, either in the light string plug or receptacle, preferably the latter. The color of each light in the group, or colors of each set in the group must be the same but successive groups can include LEDs of different colors. In an alternative embodiment, the LEDs can be oriented so that half light on during the first half of an alternating current cycle and the other half light during the second half of an alternating current cycle.

20 Claims, 2 Drawing Sheets

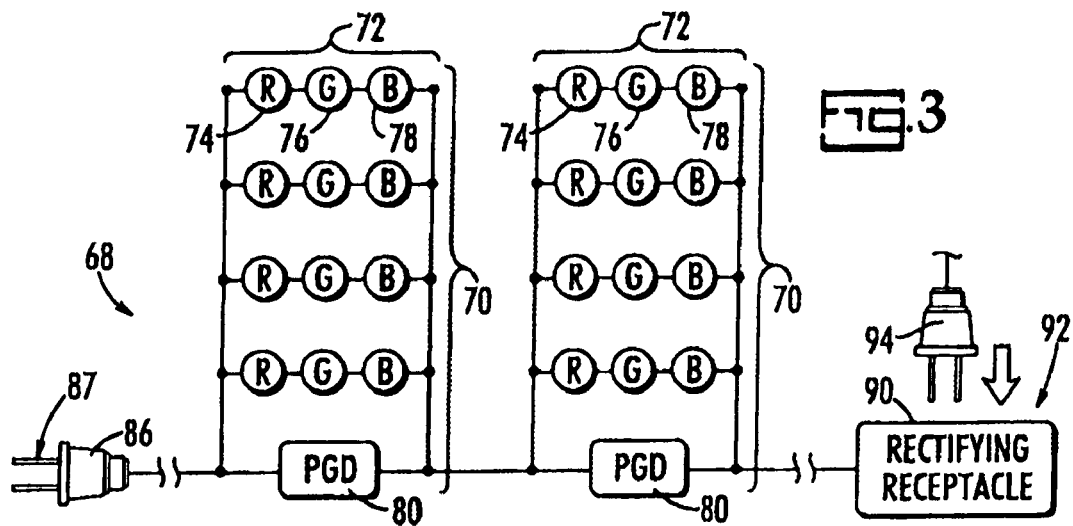
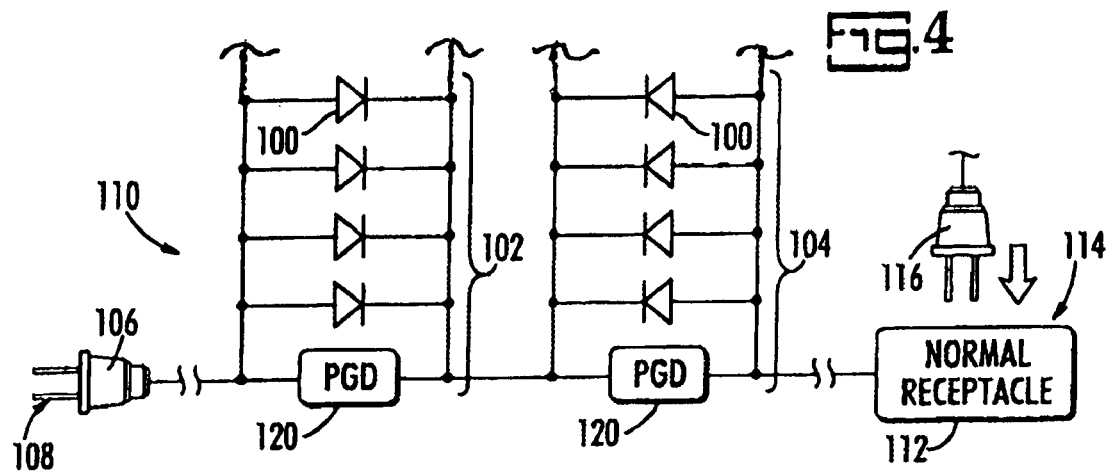

LIGHT STRING OF LEDS

PRIORITY CLAIM

The priority benefit of U.S. provisional patent application Ser. No. 60/848,660, filed Oct. 2, 2006, is claimed.

BACKGROUND OF THE INVENTION

The present invention relates generally to strings of holiday lighting such as those used for decorating Christmas trees.

Strings of lights, that is, plural lights wired together to be powered from a plug inserted into a wall outlet, are used to decorate Christmas trees and homes. They are used for both interior decorating and exterior decorating.

For a 100-lamp light set, there are typically two types: two series circuits and three series circuits. The light sets both work the same, but the difference between the two is the brightness. One type is normal brightness and the other type is referred to as "super" bright. The difference in lamp brightness is attributable to the lamp voltage. The two series circuits have a lower lamp voltage per lamp (2.5V) i.e. 125/50. Each series circuit has 50 lamps.

The three circuit set has a higher per-lamp voltage of (3.5V) i.e. 125/35, for a much higher voltage and brighter lamp. Each circuit has 35 lamps in it. This means that a "super bright" 100-light set actually has 105 lamps in it.

Prior art light strings have the following parts: (1) an AC plug containing two 3 Amp fuses with 1 line side and 1 neutral side, (2) 6"-7" interconnecting wires (22 AWG) between each socket in the series; (3) 1 AC receptacle at the end of the set; (4) 1 "return" or neutral line (22 AWG) from the receptacle on the end of the set and then back to the last socket of each circuit in the set until it eventually terminates at the plug; (5) 1 "hot" line (22 AWG) from the plug to the first socket in the first circuit in the set; (6) 1 "hot" line (22 AWG) from the plug to the additional series circuits remaining in the set; (7) plastic light sockets for two wires; (8) plastic light sockets for three wires; (9) two brass electrical terminals per wire; (10) plastic lamp plugs to hold the lamps; and (11) miniature glass lamps.

Another type of prior art light system uses series of small groups of lights in parallel with each other and with a programmable group device. This type of light string is described in U.S. Pat. No. 6,367,952, issued to the present inventor and incorporated herein by reference in its entirety. Each group is in series with each other group. If one or more lights in a group burns out or is removed, the programmable group device is programmed to maintain the current in the remaining lights of the group at levels prior to the burning out or removal of one or more of the lights.

Throughout the world, there are hundreds of millions of strings of holiday lights sold each year. Collectively, they consume significant amounts of energy and produce significant amounts of heat. Even small reductions in the amount of heat and energy consumed by holiday lighting would be a substantial benefit.

Thus, there remains a continuing need for a better string of holiday lights.

SUMMARY OF THE INVENTION

The present invention is a string of light emitting diodes (LEDs) comprising plural groups of lights, each LED in each group being electrically in parallel with each other LED in the same group, each group of LEDs being electrically in series with each other group and the string being terminated in either a plug that rectifies incoming alternating current to direct current and limits current through the circuit or a fused receptacle that delivers rectified current to the light string. A fused receptacle with rectifying circuitry is described in U.S. Pat. No. 6,869,313, issued to the present inventor and incorporated by reference in its entirety herein. Importantly, in parallel with each group of LEDs is a device that controls the current in that group. This parallel group device can control the group in several ways. In at least one embodiment, it allows the current to flow across that group from the previous group to the next group without shorting the entire light string in the event that one or more of the LEDs in that group is removed or fails. In another embodiment, it can be programmed to turn out the LEDs in that group in a programmed sequence or on command.

A particular embodiment of the present invention is a series of groups of LEDs, with each lamp in each group being electrically in parallel with each other LED in the group and with the device for regulating voltage, such as a pair of back-to-back zener diodes. Importantly, the zener diodes are kept in a "partially turned on" mode so that, in the event one of the lights burns out or is removed, it can quickly act to regulate the current flowing in the remaining bulbs.

Another embodiment of the present invention includes a series of groups of LEDs, each group formed of plural sets of LEDs, each of which is electrically in series with the other, in parallel with each other set of LEDs in that group as well as with the group device.

A feature of the present invention is that LEDs consume much less electricity and produce much less heat than incandescent lights, with the attendant savings in energy.

Another feature of the present invention is that the use of the group device acts as a voltage regulator and permits different colored LEDs to be used in the light string, as will be explained in more detail below. Different colors of LEDs draw different amounts of electrical current. Placing those LEDs in parallel creates technical challenges. The present arrangement requires the LEDs in each group to be the same color (or the same set of colors) but each group can be a different color (or different set of colors).

Another feature of the present invention is that the use of LEDs allows a much larger number of lights on each light string.

Yet another feature of the present invention is the incorporation of the voltage regulator into each group. This feature protects from overcurrent conditions by limiting current to each LED in that group.

Finally, in prior art LED light strings, resistors are placed in parallel to the LEDs which share electrical current. In the present invention, these resistors are not needed and, accordingly, the energy they consume, in the form of heat, is avoided.

These and other features and their advantages will become apparent to those skilled in the art of the manufacturing and use of strings of lights from a careful reading of the Detailed Description of Preferred Embodiments, accompanied by the drawings.

BRIEF DESCRIPTION OF THE DRAWINGS

In the drawings,

FIG. 3 is a schematic view of an electrical circuit for a string of LEDs, according to a second preferred embodiment of the present invention; and FIG. 4 is a schematic view of an electrical circuit for a string of LEDs, according to a third preferred embodiment of the present invention.

DETAILED DESCRIPTION OF PREFERRED EMBODIMENTS

The present invention is a string of LEDs (light emitting diodes) for use in holiday lighting, and equivalent in function to strings of minilights for example.

A "string of lights" means a plurality of lights all of which are in electrical connection with each other and with an electrical plug and an electrical receptacle so that, when the plug is connected to a source of electricity, all of the lights light up. The lights of the present string of lights are light-emitting diodes. Light-emitting diodes (LEDs) are solid state, semiconductor devices that emit light of a particular color when a voltage is applied across their terminals. LEDs are diodes so that they conduct electrical current in only one direction and not in the reverse direction.

Figure 1:
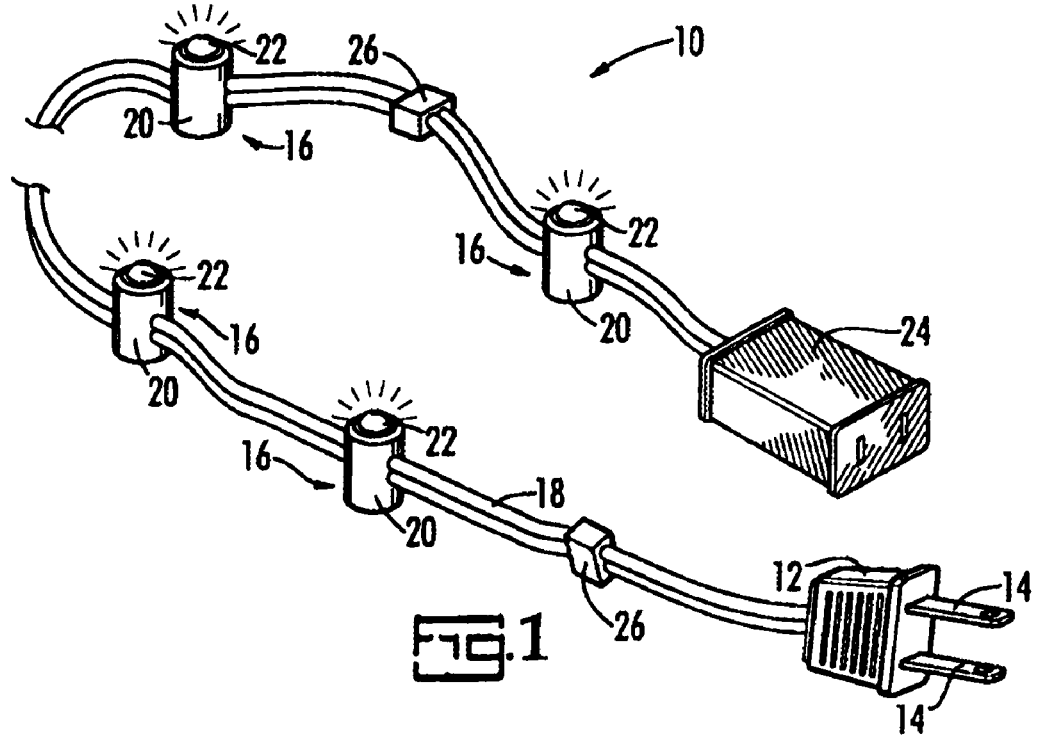
FIG. 1 is a perspective view of a section of a string of LEDs, according to a preferred embodiment of the present invention.

Referring now to FIG. 1, there is illustrated in perspective a preferred embodiment of the present invention. A light string 10 includes an electrical plug 12 having two terminals 14 that are insertable into a wall socket (not shown) or other source of electrical current and plural LEDs 16 that are physically and electrically connected by wires 18. String 10 terminates in an electrical receptacle 24 that can receive another electrical plug 12 from another string of LEDs.

Plug 12 may be a conventional alternating current plug or one with a rectifier inside that converts alternating current to direct current and might also have a fuse that limits current to protect string 10 from excessive current. An electrical plug of this type is disclosed in U.S. Pat. No. 5,777,868, issued to the present inventor and which is incorporated herein in its entirety by reference. However, a preferred alternative is for plug 12 to be part of a string of lights that includes a fused receptacle with a rectifying circuit as described in U.S. Pat. No. 6,869,313, as noted above. This receptacle, in addition to having a protective fuse to prevent and overcurrent condition, rectifies the electrical current delivered to the LEDs but passes alternating current from its plug and wires to any string of lights plugged into receptacle.

Still another possibility, as described more fully below, is to not rectify the alternating current but to arrange the LEDs so that some of them are oriented to pass the received electrical current during the first part of the alternating current wave and the remainder of the LEDs are oriented to pass electrical current during the other part of the alternating current wave.

Each light 16 includes a socket 20 and an LED 22. At intervals along string 10, programmable group devices (PGDs) 26 and connected to string 10 in a manner that will be explained in more detail below. Alternatively, PGDs may be incorporated into one socket 20 out of every few sockets 20.

Figure 2:
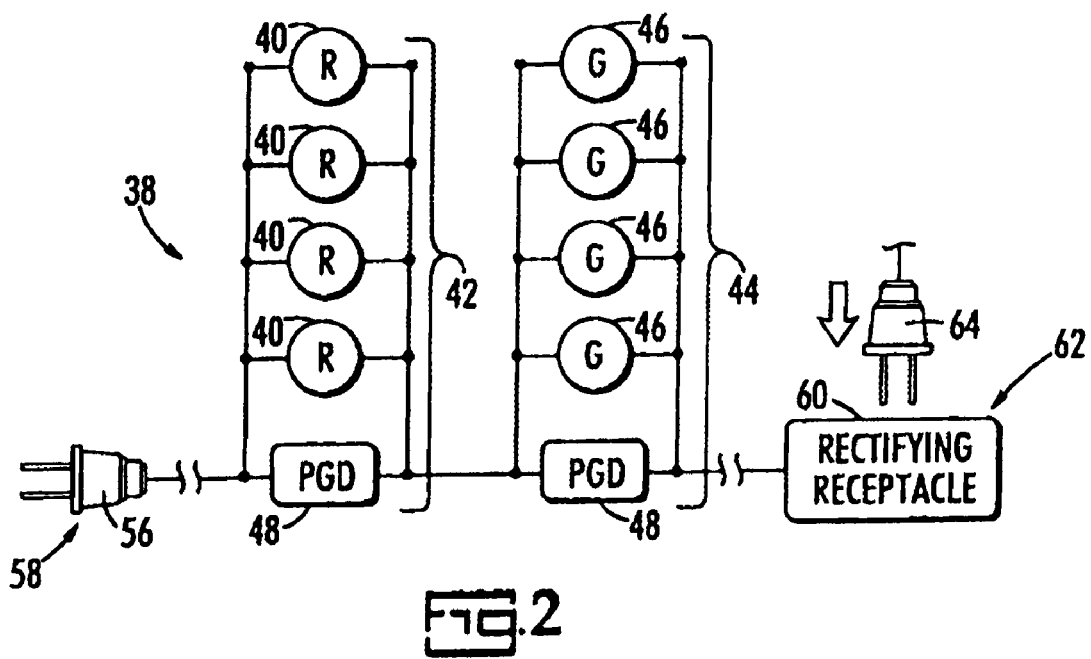
FIG. 2 is a schematic view of an electrical circuit for a string of LEDs, according to a first preferred embodiment of the present invention.

As best seen in FIGS. 2-4, LEDs are arranged in groups and the groups connected in electrical series in each string. In an LED string 38 shown in FIG. 2, there are four LEDs 40 in a group 42, each LED 40 of group 42 being connected electrically in parallel to the other LEDs 40. LEDs 40 in each group 42 must draw the same current, but LEDs 40 of different groups 42 can draw different currents. Since LEDs of different colors draw different currents, this permits the LEDs 40 of different groups 42 to be different colors. For example, red LEDs draw about 20 mA; green LEDs draw about 30 mA; and blue LEDs draw 50 mA. Accordingly, LEDs 40 can be arranged in a group 42 with four diodes all of the same color, such as red, followed by a group 44 including four other LEDs of a different color such as green LEDs 46, followed by four more red ones or four more blue ones, and so on.

PGDs 48 for each group can be designed to operate in connection with the current drawn by the LEDs 40 of that group, that is, a different design of PGD 48 for each group color, so that if any of the LEDs 40 burn out or are removed, PGD 48 for that group becomes operational and draws enough current so that no significantly different current is drawn by any of the remaining LEDs 40 of that group 42 and string 38 as a whole does not cease to conduct.

LED string 38 has a plug 56 on one end 58 and a receptacle 60 on the opposing end 62. Preferably, receptacle 60 is a fused, rectifying receptacle, as referenced above, that delivers rectified current to the load on string 38 but regular AC to the next plug 64 if one is plugged into receptacle 60. Alternatively, a rectifying plug of the referenced variety can be used instead of rectifying receptacle 60.

As illustrated in FIG. 3, there is an LED string 68 having four sets 72 of three series-connected LEDs 74, 76, 78, each set 72 being connected electrically in parallel with the other sets 72. Sets 72 could have a number of lights other than 3. Each LED can be all the same color or can each be a different color (red, green, blue, for example) as long as these same three colors of LEDs 74, 76, and 78 are present in each set 72 so that all sets 72 of a single group 70 draw the same current. Each group 70 may be the same as every other group or may have different sets of LEDs.

As before, a plug 86 is at one end 87 of string 68 and a rectifying receptacle 90 is at the other end 92 to deliver AC to the next plug 94 but DC to the diodes 74, 76, 78.

In FIG. 4, the LEDs 100 in string 110 are represented using the conventional electrical symbol for diodes to show the direction electrical current will pass. Diodes 100 in the first group 102 are oriented to pass electricity from left to right but not right to left. The diodes 100 in the second group 104 are reversed to pass electricity from right to left but not left to right. Accordingly, in the first half cycle of 60 cycle alternating current, first group 102 will light but second group 104 will not. During the second half cycle, first group 102 will not light but second group 104 will light. At 60 Hz, each group 102, 104, will flicker on and off at the rate of 60 times per minute, which is just faster than the flicker frequency of the human eye. Thus, both groups will appear to be on all the time but perhaps not as bright as if they were on all the time.

This light string 110 has a normal plug 106 at a first end 108 and a normal receptacle 112 at an opposing end 114 for receiving a next plug 116. No rectification needs to take place since each diode 100 is oriented to operate during a half cycle of alternating current.

If any diode 100 burns out in group 102 or 104, a parallel group device (PGD) 120 will pass the current from one group to the next so that string 110 continues to light and adjust the current flowing through group so that each LED 100 carries the same current as before burnout.

In one embodiment, parallel group device 26, 48, 80, 120, is composed of an integrated circuit comprised of multiple semiconductor junctions cascaded in a series fashion, or, alternatively, of a bipolar device; the number of semiconductor junctions is determined by the lamp voltage. If an LED burns out, its contacts degrade or it is removed from its group, the voltage drop across the remaining LEDs of the group changes slightly because of the increased current flow across the remaining lamps and because of the voltage drop due to the resistance of the wire itself.

By using PN junction semiconductors or custom bipolar devices, which have a voltage drops across them of a magnitude that depends on the design and material that the semiconductors are made of, a PGD 26, 48, 80, 120, can be constructed that is pre-programmed to regulate the current flowing through, and the voltage drop across, the group so that it does not exceed a particular level but rather remains constant no matter what happens to an individual lamp 22.

For use with alternating current (AC), device 26, 48, 80, 120, is preferably a pair of zener diodes arranged in back-to-back orientation that act as voltage regulators. The voltage of the circuit determines how many groups there are and the voltage drop of each group determines the voltage characteristics needed for the voltage regulator.

Each group is designed so that a small current passes through the zener diodes at all times, which is characterized as a "partially turned on" state. This state allows them to respond rapidly as a voltage regulator.

Zener diodes characteristically have a sharp turnover or breakdown reverse voltage curve. However, at the start of this curve, they have a small region that is relativity flat wherein they can operate that is not a full "ON" condition. If a zener diode is operated in this part of the characteristic curve, no breakdown will occur, but a small leakage current is typical, indicating proximity to the breakdown or avalanche point. Operating the zener in this region and deliberately keeping it there uses a little more power then when the zener diode is kept out of this region, however regulation time is shortened. In the design of these parallel groups of lamps operating on AC, voltage regulation is of the utmost importance.

The parallel LED groups, being connected in a series fashion, act as a voltage divider and this network becomes a constant current, constant voltage, multi-element, compound circuit. The parallel structure of groups mean that the LEDs cannot have shunts, where in normal series connected miniature light sets, all lamps have shunts in order to keep current flowing throughout the series network in the event of a filament failure. In this parallel LED configuration, the LEDs can fail for any reason, however the parallel group configuration continues to light the remaining lamps if one or more of the aforementioned conditions occurs. Due to the fact that this is a complex, multi-element, parallel/series network and series/parallel/series network, the loss of one or more lamps in a parallel group will cause a change in current flow. This current flow decreases across the effected group, therefore decreasing the voltage drop across it, thus increasing the voltage across the effected group. This voltage increase pushes the zener diodes instantly into the breakover region of their characteristic curve and they immediately begin to regulate the voltage in that group by passing current enough to balance the entire network. This keeps the lamps at a constant voltage, thus extending their life considerably.

It will be apparent to those skilled in the art of electrical light strings that many substitutions and modifications can be made to the preferred embodiments described above without departing from the spirit and scope of the present invention, which is defined by the appended claims.

What is claimed is:

1. A light string for use with a source of electrical current, said light string comprising:
    (a) an electrical plug;
    (b) an electrical receptacle;
    (c) light-emitting diodes arranged in groups interconnected electrically in series and connected in series with said electrical plug and said electrical receptacle, each group of said groups having plural sets of light-emitting diodes, each set of said plural sets having at least one light-emitting diode, said plural sets being interconnected electrically in parallel; and
    (d) plural voltage regulators, each voltage regulator of said plural voltage regulators being arranged electrically in parallel with said each group, said each voltage regulator maintaining electrical current in said plural sets of light-emitting diodes of said each group when said at least one light emitting diode in said each group fails.

2. The light string as recited in claim 1, further comprising a rectifier in electrical connection with said groups for rectifying electrical current to said light-emitting diodes when said plug is inserted into a source of electrical current.

3. The light string as recited in claim 2, wherein said rectifier is carried by said receptacle.

4. The light string as recited in claim 1, further comprising a fuse in electrical connection with said light-emitting diodes.

5. The light string as cited in claim 2, further comprising a fuse in electrical connection with said light-emitting diodes and wherein said rectifier and said fuse are carried by said receptacle.

6. The light string as recited in claim 1, wherein said light-emitting diodes are oriented so that each light emitting diode passes electrical current at least 50% of the time.

7. The light string as recited in claim 1, wherein said light-emitting diodes in said each group are all of the same color.

8. The light string as recited in claim 1, wherein said at least one light-emitting diode is one diode.

9. The light string as recited in claim 1, wherein said at least one light-emitting diode is more than one diode and each diode of said more than one diode is a different color.

10. The light string as recited in claim 1, wherein said voltage regulator is a pair of back-to-back zener diodes.

11. The light string as recited in claim 10, wherein said zener diodes are selected to be operating in a partially turned on state when all light-emitting diodes in said each group are lighted.

12. The light string as recited in claim 1, wherein said at least one light-emitting diode is three diodes and said three diodes are red, green or blue.

13. The light string as recited in claim 1, wherein one light-emitting diode of said light-emitting diodes of said each group has a socket and wherein said each voltage regulator is included within said socket of said one light emitting diode of said each group.

14. The light string as recited in claim 1, wherein said each group contains light-emitting diodes of a single color selected from the group consisting of red, green and blue.

15. A light string for use with a source of electrical current, said light string comprising:
    (a) an electrical plug;
    (b) an electrical receptacle;
    (c) light-emitting diodes arranged in groups interconnected electrically in series and connected in series with said electrical plug and said electrical receptacle, each group of said groups having plural sets of light-emitting diodes, each set of said plural sets having at least two light-emitting diodes, said plural sets being interconnected electrically in parallel, said light emitting diodes being arranged to pass electrical current at least 50% of the time, and wherein each set of said plural sets of lights has the same current; and
    plural voltage regulators, each voltage regulator of said plural voltage regulators being arranged electrically in parallel with said each group, said each voltage regulator maintaining electrical current in said plural sets of light-emitting diodes of said each group when said at least one light emitting diode in said each group fails.

16. The light string as recited in claim 15, wherein said light-emitting diodes of said plural sets are the same colors so that the voltage drop of said each set is the same.

17. The light string as recited in claim 15, wherein said light emitting diodes are red, green or blue diodes.

18. The light string as recited in claim 15, wherein said each group produces a voltage drop when electrical current is supplied to said plug of said light string, and wherein said voltage drop is the same for said each group.

19. The light string as recited in claim 15, further comprising a rectifier in electrical connection with said light-emitting diodes.

20. The light string as recited in claim 19, wherein said rectifier is carried by said receptacle.

* * * * *